United States Patent
Cho et al.

(10) Patent No.: US 11,637,272 B2
(45) Date of Patent: Apr. 25, 2023

(54) SURFACE-TREATED ACTIVE MATERIALS AND SURFACE TREATMENT METHOD THEREOF

(71) Applicant: SM LAB CO., LTD., Ulju-gun Ulsan (KR)

(72) Inventors: Jae Phil Cho, Ulju-gun Ulsan (KR); Seung Jun Myeong, Ulju-gun Ulsan (KR)

(73) Assignee: SM LAB CO., LTD., Jiju-gun ulsan (KR)

( * ) Notice: Subject to any disclaimer, the term of this patent is extended or adjusted under 35 U.S.C. 154(b) by 276 days.

(21) Appl. No.: 15/708,922

(22) Filed: Sep. 19, 2017

(65) Prior Publication Data

US 2018/0190971 A1 Jul. 5, 2018

(30) Foreign Application Priority Data

Dec. 30, 2016 (KR) .................. 10-2016-0183760

(51) Int. Cl.
*H01M 4/04* (2006.01)

(52) U.S. Cl.
CPC ....... *H01M 4/0402* (2013.01); *H01M 4/0471* (2013.01)

(58) Field of Classification Search
CPC .................. H01M 4/0471; H01M 4/0402
See application file for complete search history.

(56) References Cited

U.S. PATENT DOCUMENTS

| | | | |
|---|---|---|---|
| 8,535,832 B2 | 9/2013 | Karthikeyan et al. | |
| 8,865,348 B2 * | 10/2014 | Sun ................. | H01M 4/525 429/223 |
| 9,337,487 B2 * | 5/2016 | Sun ................. | H01M 4/131 |
| 9,466,832 B2 * | 10/2016 | Nagai ............. | H01M 10/0525 |
| 9,843,033 B2 * | 12/2017 | Kaseda ........... | H01M 4/131 |
| 9,905,840 B2 * | 2/2018 | Kwak ............. | H01M 10/0525 |
| 9,905,850 B2 * | 2/2018 | Kwak ............. | H01M 4/505 |
| 10,957,903 B2 * | 3/2021 | Yang .............. | H01M 4/525 |
| 2003/0138697 A1 | 7/2003 | Leising et al. | |
| 2012/0263998 A1 * | 10/2012 | Thackeray ...... | H01M 4/131 429/156 |
| 2014/0045067 A1 * | 2/2014 | Cho ................ | C01G 45/1228 429/220 |
| 2014/0255603 A1 * | 9/2014 | Xiao .............. | H01M 4/0471 427/213.3 |

(Continued)

FOREIGN PATENT DOCUMENTS

KR  100738192 B1 * 7/2007
KR  10-2012-0082373  7/2012

(Continued)

OTHER PUBLICATIONS

Machine translated abstract: KR-100738192-B1 (Year: 2007).*
Machine translated abstract: KR-101253319-B1 (Year: 2013).*

*Primary Examiner* — Milton I Cano
*Assistant Examiner* — Mary G Henshaw
(74) *Attorney, Agent, or Firm* — Ware, Fressola, Maguire & Barber LLP (57) ABSTRACT

An active material and a surface treatment method of the active material are provided. A surface of the active material may be treated with a coating layer including a first metal oxide containing lithium, and a second metal oxide.

3 Claims, 10 Drawing Sheets

(56) References Cited

U.S. PATENT DOCUMENTS

| | | | | |
|---|---|---|---|---|
| 2015/0132640 A1* | 5/2015 | Balaya | ................. | H01M 4/136 |
| | | | | 429/213 |
| 2016/0276659 A1* | 9/2016 | Choi | ..................... | H01M 4/136 |
| 2017/0018767 A1* | 1/2017 | Park | ..................... | H01M 2/162 |
| 2017/0263917 A1* | 9/2017 | Dai | ....................... | H01M 4/131 |
| 2018/0097225 A1* | 4/2018 | Yamaya | ............ | H01M 10/0525 |
| 2018/0108940 A1* | 4/2018 | Kwon | .................. | H01M 4/131 |
| 2018/0287135 A1* | 10/2018 | Shin | .................... | H01M 10/052 |

FOREIGN PATENT DOCUMENTS

| | | | | |
|---|---|---|---|---|
| KR | 101253319 B1 * | 4/2013 | ............ | H01M 4/366 |
| KR | 1020150136953 | 12/2015 | | |

* cited by examiner

SURFACE-TREATED ACTIVE MATERIALS AND SURFACE TREATMENT METHOD THEREOF

CROSS-REFERENCE TO RELATED APPLICATION

This application claims the benefit of Korean Patent Application No. 10-2016-0183760, filed on Dec. 30, 2016, in the Korean Intellectual Property Office, the disclosure of which is incorporated herein by reference.

BACKGROUND

1. Field of the Invention

At least one example embodiment relates to a surface-treated active material and a surface treatment method of an active material.

2. Description of the Related Art

Active materials are most widely used due to their excellent electrochemical performances as well as lifespan characteristics. However, since active materials have low structural stability, applying of active materials to high capacity batteries is limited.

To enhance a performance, various lithium transition metal oxides, for example, $LiMn_2O_4$, olivine-type lithium iron phosphate, lithium-oxide based active materials, and the like, are developed. The above active materials have advantages of a low price and a high structural stability of a three-dimensional (3D) tunnel structure, and are applicable to lithium ion secondary batteries due to excellent output characteristics. However, the active materials have an issue caused by a decrease in a stability and lifespan during repetitive charging and discharging of lithium secondary batteries. The issue may be expected to be caused by a decomposition of an electrolyte due to moisture inside a battery or other influences, or by an increase in an internal resistance of the battery and degradation of active materials. In particular, an active material may be degraded due to residual lithium on a surface of the active material or lithium by-products (for example, $Li_2CO_3$, LiOH, and the like).

The above residual lithium and lithium by-products may form a resistive film and may cause swelling by generating gas in a battery as well as gelation by reacting with a solvent (for example, a polyvinylidene fluoride (PVDF)) in a preparation of an anion active material slurry. Accordingly, the residual lithium and lithium by-products may have an influence on a decrease in lifespan characteristics of the battery.

Recently, attempts are being made to treat residual lithium on a surface of an active material using a surface treatment, for example, a carbon coating technology, and to enhance output and lifespan characteristics. However, it is difficult to form a uniform carbon coating layer, and a process cost due to carbon coating increases.

SUMMARY

The present disclosure is to solve the foregoing problems, and an aspect provides an active material having an enhanced performance through a surface treatment with a metal oxide.

Another aspect provides a surface treatment method of a surface-treated active material.

However, the problems to be solved in the present disclosure are not limited to the foregoing problems, and other problems not mentioned herein would be clearly understood by one of ordinary skill in the art from the following description.

According to an aspect, there is provided an active material having a surface treated with a coating layer including a first metal oxide containing lithium, and a second metal oxide.

The first metal oxide may be represented by the following Chemical Formula 1:

[Chemical Formula 1]

In Chemical Formula 1, M includes at least one of Ni, Co, Fe, Mn, Ru, Sn, Cr, Ti, Al, P, V, S, As, Mo and W, and x, y and z are 1 to 8.

The second metal oxide may include at least one of P, S, As, Mo, W and V.

The coating layer may further include a polyanion. The polyanion may include at least one of $(XO_4)^{n-}$ or $(XmO_{3m+1})^{n-}$ in which X includes at least one of P, S, As, Mo, W and V, and n and m are 1 to 4.

A mass ratio of the first metal oxide:the second metal oxide may range from 1:1 to 1:100.

A mass ratio of the second metal oxide:a polyanion may range from 1:1 to 1:100.

The first metal oxide may have a particle diameter of 10 nanometers (nm) to 5,000 nm.

According to another aspect, there is provided a surface treatment method of an active material, the surface treatment method including preparing a precursor solution including a first precursor used to generate a first metal oxide containing lithium, and a second precursor used to generate a second metal oxide, coating the active material with the first precursor and the second precursor by mixing the active material with the precursor solution and by precipitating a mixture of the active material and the precursor solution, and heat-treating the active material.

A mass ratio of the first precursor:the second precursor may range from 1:1 to 1:100.

The second precursor may include at least one of an ammonium salt, an aniline salt, a pyridinium salt, a methylammonium salt and an ammonium carbonate salt that are used to generate a polyanion.

The first precursor may include at least one of a nitride, a chloride, a sulfide, an acetate and a carbonate of a metal.

The heat-treating may include heat-treating the active material at a temperature of 300° C. to 500° C. for 5 hours to 12 hours.

During the coating, the active material may include residual lithium on a surface of the active material.

According to another aspect, there is provided a surface treatment method of an active material, the surface treatment method including separately preparing a first precursor solution and a second precursor solution, the first precursor solution being used to generate a first metal oxide containing lithium, and the second precursor solution being used to generate a second metal oxide, coating the active material with a first precursor by mixing the active material with the first precursor solution and by precipitating a mixture of the active material and the first precursor solution, coating the coated active material with a second precursor by mixing the coated active material with the second precursor solution and by precipitating a mixture of the coated active material and the second precursor solution, and heat-treating the active material coated with the second precursor.

The coating of the coated active material with the second precursor may include coating, with the second precursor, either one or both of a surface of the active material and a first precursor coating layer formed by coating the active material with the first precursor.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments of the present disclosure will be described in detail with reference to the accompanying drawings. When it is determined detailed description related to a related known function or configuration they may make the purpose of the present disclosure unnecessarily ambiguous in describing the present disclosure, the detailed description will be omitted here. Also, terms used herein are defined to appropriately describe the example embodiments and thus may be changed depending on a user, the intent of an operator, or a custom of a field to which the present disclosure pertains. Accordingly, the terms must be defined based on the following overall description of this specification. Like reference numerals present in the drawings refer to the like elements throughout.

According to an example embodiment, an active material (hereinafter, referred to as a "surface-treated active material") having a surface that is treated may be provided. The surface of the active material may be treated with a metal oxide, and thus it is possible to enhance an initial efficiency, a lifespan characteristic and a rate characteristic.

Figure 1:
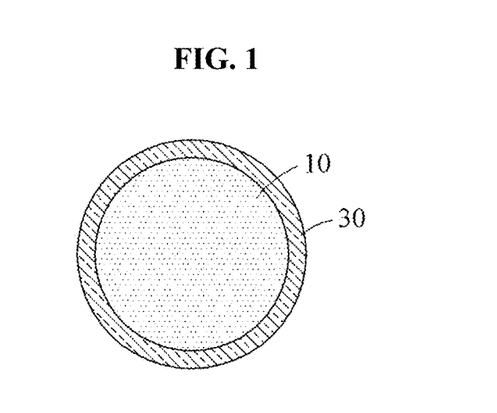
FIG. 1 illustrates a cross section of a surface-treated active material according to an example embodiment.

FIG. 1 illustrates a cross section of a surface-treated active material according to an example embodiment. The surface-treated active material may include an active material 10, and a coating layer 30 formed on the active material 10.

As the active material 10, all active materials applicable in the art, for example, a lithium-oxide based active material may be used. The lithium-oxide based active material may include, for example, a lithium nickel oxide, a lithium manganese oxide, a lithium cobalt oxide, and a complex oxide (for example, a lithium-nickel based transition metal complex oxide) thereof obtained by substituting a transition metal oxide or a portion of transition metals with another transition metal. The active material 10 may include, for example, $LiCoO_2$, $LiNiO_2$, $LiMn_2O_4$, $LiFePO_4$, $LiFe_{1-x}Mn_xPO_4$, $LiNi_{1-x-y}Mn_xCo_yO_2$ ($0 \leq x < 1$, $0 \leq y < 1$), $LiNi_{1-x-y-z}Co_xM_{1y}M_{2z}O_2$ (in which $M_1$ and $M_2$ are independently Al, Ni, Co, Fe, Mn, V, Cr, Ti, W, Ta, Ma or Mo, $0 \leq x < 1$, $0 \leq y < 1$, and $0 \leq z < 1$), $LiMn_{2-x}M_xO_4$ (in which M=Li, Mg, Al, and $0 \leq x \leq 0.5$), $LiNi_xCo_yMn_zO_2$ (in which $x+y+z=1$), $LiNi_xCo_yAl_zO_2$ (in which $x+y+z=1$), $LiFe_{1-x}Mn_xPO_4$ (in which $0 \leq x \leq 1.0$) $LiCr_xMn_{2-x}O_4$ (in which $0 \leq x \leq 0.5$), $LiFe_xMn_{2-x}O_4$ (in which $0 \leq x \leq 1.0$), $LiCo_xMn_{2-x}O_4$ (in which $0 \leq x \leq 1.0$), $LiNi_xMn_{2-x}O_4$ (in which $0 \leq x \leq 0.5$), $LiCu_xMn_{2-x}O_4$ (in which $0 \leq x \leq 0.5$), $xLi_2MnO_3$-$(1-x)LiNi_aCo_bMn_cO_2$ (in which $a+b+c=1$), $LiNiVO_4$, $LiCoPO_4$, $LiNiPO_4$, and the like.

For example, a residual lithium layer 20 may be formed on the surface of the active material 10.

The coating layer 30 may be stably formed on the active material 10 by reacting with residual lithium on the surface of the active material 10 and/or lithium by-products.

The coating layer 30 may include a first metal oxide containing lithium, and a second metal oxide. For example, the first metal oxide and the second metal oxide may be mixed and included in the coating layer 30, and/or a layer of each of the first metal oxide and the second metal oxide may be formed and included in the coating layer 30. The coating layer 30 may have a thickness of 1 nanometers (nm) to 10,000 nm.

The first metal oxide containing lithium may stably form the coating layer 30 by reacting with residual lithium on the surface of the active material 10 and/or lithium by-products, to enhance an initial efficiency of a battery.

The first metal oxide may be represented by the following Chemical Formula 1:

[Chemical Formula 1]

$$Li_xM_yO_z$$

In Chemical Formula 1, M includes at least one of Ni, Co, Fe, Mn, Ru, Sn, Cr, Ti, Al, P, V, S, As, Mo and W, and x, y and z are rational numbers, desirably 1 to 8.

The second metal oxide may enhance lifespan characteristics and rate characteristics, and may include, for example, at least one metal oxide among P, S, As, Mo, W and V.

A mass ratio of the first metal oxide:the second metal oxide may range from 1:1 to 1:100. When the mass ratio is within the above range, a stable coating layer 30 may be formed, and an effect of simultaneously enhancing the initial efficiency and lifespan characteristics may be obtained.

The first metal oxide may have a particle diameter of 10 nm to 5,000 nm. When the particle diameter is within the above range, a formation of a non-uniform coating layer 30 due to a growth of a metal oxide may be prevented, and a stable coating layer 30 may be formed on the active material 10.

The coating layer 30 may further include a polyanion. The polyanion may be a precursor of the second metal oxide. For example, a portion of the polyanion may remain in the coating layer 30 by controlling a heat treatment condition, and the like, and the polyanion may contribute to an improvement of rate characteristics and a capacity retention ratio.

The polyanion may include at least one of $(XO_4)^{n-}$ or $(XmO_3m+1)^{n-}$ in which X includes one of P, S, As, Mo, W and V, and n and m are rational numbers, for example, 1 to 4.

A mass ratio of the second metal oxide:the polyanion may range from 1:1 to 1:100. When the mass ratio is within the above range, a generation of gas in a battery due to a formation of an excessively large amount of polyanion may be prevented, and lifespan characteristics and rate characteristics may be enhanced.

According to an example embodiment, a surface treatment method of an active material may be provided. In the surface treatment method, a first metal oxide may be formed through a reaction with residual lithium on a surface of the active material, and a second metal oxide may be formed using a polyanion precursor. Thus, the surface of the active material may be treated with a uniform and stable coating layer.

Figure 2:
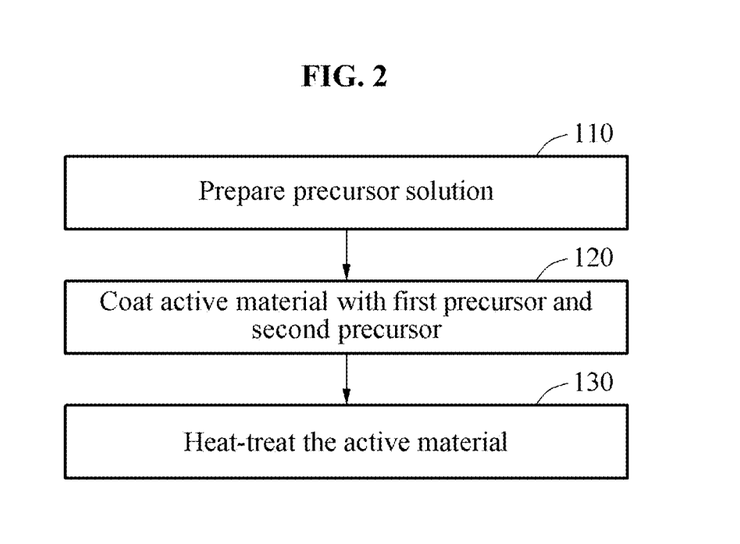
FIG. 2 is a flowchart illustrating an example of a surface treatment method of an active material according to an example embodiment.

FIG. 2 is a flowchart illustrating an example of a surface treatment method of an active material according to an example embodiment. The surface treatment method of FIG. 2 may include operation 110 of preparing a precursor solution, operation 120 of coating the active material with a first precursor and a second precursor, and operation 130 of heat-treating the active material. The surface treatment method may further include a drying operation.

In operation 110, a precursor solution including a first precursor and a second precursor is prepared. The first precursor may be used to generate a first metal oxide containing lithium, and the second precursor may be used to generate a second metal oxide.

For example, the first precursor may include at least one of a nitride, a chloride, a sulfide, an acetate and a carbonate of a metal. The metal may include at least one of Ni, Co, Fe, Mn, P, V, S, As, Mo and W.

For example, the second precursor may be a precursor to generate a polyanion, and may include at least one of an ammonium salt, an aniline salt, a pyridinium salt, a methylammonium salt and an ammonium carbonate salt of $(XO_4)^{n-}$ or $(XmO_3m+1)^{n-}$. The second precursor may include, for example, $H_3PO_4$, $NH_4H_2PO_2O_4$, $(NH_4)_2HPO_4$, and the like.

For example, the first precursor may include a metal with a greater reactivity to lithium than the second precursor.

In the precursor solution, a mass ratio of the first precursor:the second precursor may range from 1:1 to 1:100.

The precursor solution may include, for example, water and/or an organic solvent, such as alcohol, acetone, ethylene glycol, and the like.

For example, the precursor solution may include a precursor with a concentration of 1 M to 5 M.

Figure 3:
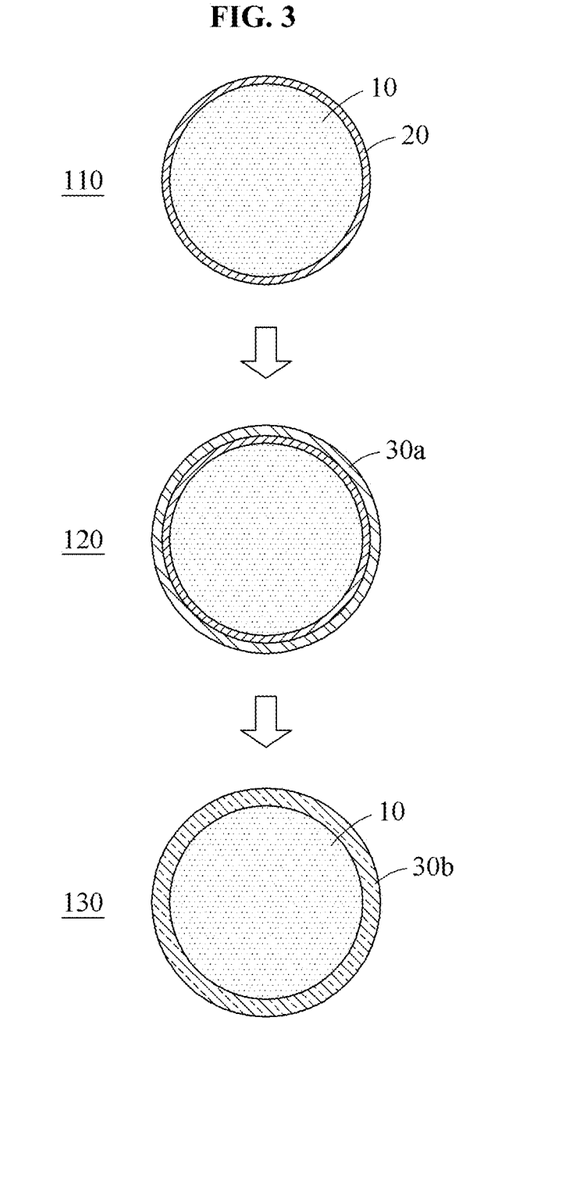
FIG. 3 illustrates a cross section of a surface-treated active material prepared based on the surface treatment method of FIG. 2.

FIG. 3 illustrates a cross section of the surface-treated active material prepared based on the surface treatment method of FIG. 2.

Referring to FIG. 3, in operation 120, the active material and the precursor solution are mixed and stirred, and the active material is coated with the first precursor and the second precursor, to form a precursor coating layer 30a. For example, the precursor coating layer 30a may include a first precursor, and a polyanion as a second precursor.

The surface treatment method of FIG. 2 may further include a drying operation. In the drying operation, a solvent may be removed by stirring a mixture of the active material and the precursor solution while applying heat to the mixture, or by evaporating the mixture under a reduced pressure, after operation 120. When the solvent is removed, heat-drying may be performed in an oven. In the drying operation, a temperature may be appropriately selected based on a solvent of the precursor solution, and may be, for example, a temperature of 50° C. to 200° C., a temperature of 60° C. to 180° C., or a temperature of 80° C. to 150° C.

In operation 130, the active material 10 with the precursor coating layer 30a is heat-treated, and residual lithium on the surface of the active material 10 is reacted with the first precursor and/or the second precursor, to form a first metal oxide. Also, a second metal oxide is formed based on at least a portion of the second precursor. Accordingly, the active material 10 having the surface treated with a coating layer 30b may be obtained.

Operation 130 may be performed in air and an inert gas atmosphere, at a temperature of 300° C. to 1,000° C., a temperature of 350° C. to 800° C. or a temperature of 400° C. to 600° C. for 10 minutes or longer, 30 minutes or longer, or 30 minutes to 5 hours. By controlling a temperature and time for the heat-treating, a thickness of the coating layer 30b and a composition of a metal oxide may be adjusted.

Figure 4:
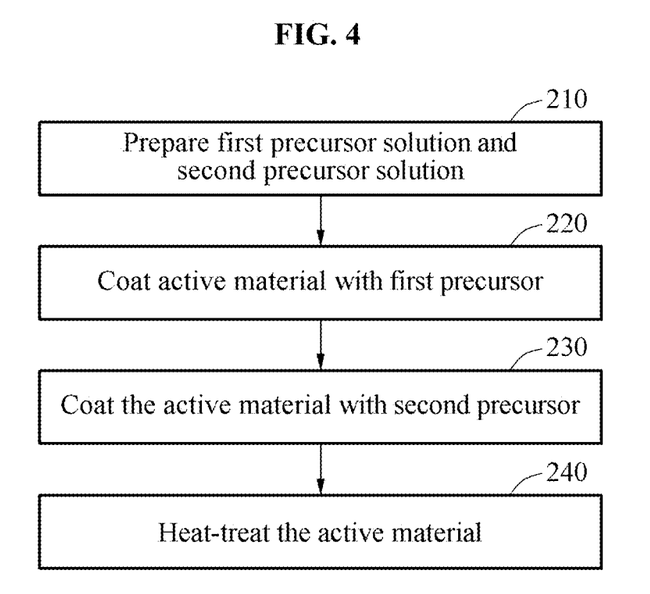
FIG. 4 is a flowchart illustrating another example of a surface treatment method of an active material according to an example embodiment.

FIG. 4 is a flowchart illustrating another example of a surface treatment method of an active material according to an example embodiment. The surface treatment method of FIG. 4 may include operation 210 of preparing a first precursor solution and a second precursor solution, operation 220 of coating the active material with a first precursor, operation 230 of coating the coated active material with a second precursor, and operation 240 of heat-treating the active material. The surface treatment method may further include a drying operation.

In operation 210, the first precursor solution and the second precursor solution are separately prepared. Components of each of the first precursor solution and the second precursor solution are the same as those described above with reference to FIG. 2.

For example, a concentration and content of each of the first precursor solution and the second precursor solution may be adjusted based on a composition ratio of the precursor solution described above with reference to FIG. 3.

A mass ratio of a first precursor of the first precursor solution:a second precursor of the second precursor solution may range from 1:1 to 1:100.

Figure 5:
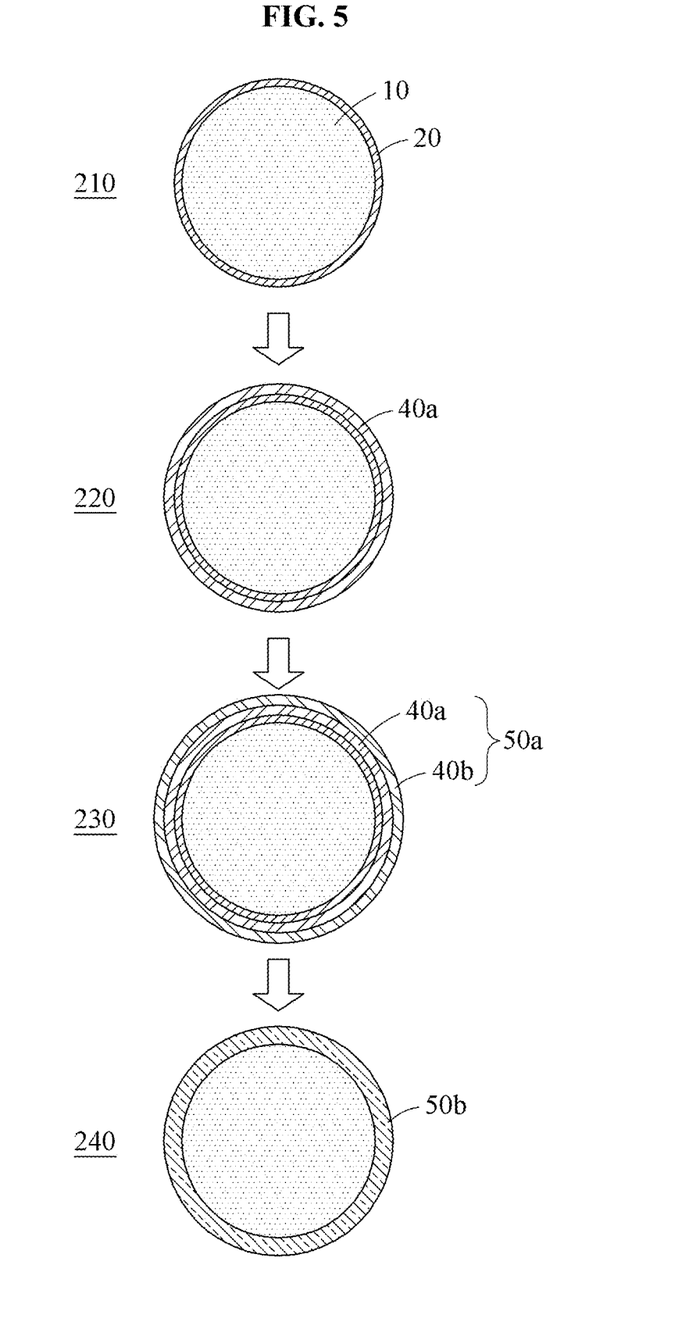
FIG. 5 illustrates a cross section of a surface-treated active material prepared based on the surface treatment method of FIG. 4.

FIG. 5 illustrates a cross section of the surface-treated active material prepared based on the surface treatment method of FIG. 4. Referring to FIG. 5, in operation 220, the active material is coated with the first precursor by mixing and precipitating the active material 10 and the first precursor solution, to form a first precursor coating layer 40a. The first precursor coating layer 40a may be formed first on the active material 10, and accordingly may more easily react with residual lithium on the active material 10, may stably form a coating layer 50a, and may enhance an initial efficiency.

In operation 230, the second precursor solution and the active material 10 coated with the first precursor coating layer 40a are mixed and precipitated, to form a second precursor coating layer 40b. For example, the second precursor coating layer 40b may be formed by coating, with the second precursor, either one or both of the first precursor coating layer 40a and the surface of the active material 10, and desirably coating the first precursor coating layer 40a.

The drying operation may be performed after operation 220, operation 230, or both, and a process condition is the same as those described above with reference to FIG. 3.

In operation 240, the active material 10 on which a precursor coating layer 50a is formed is heat-treated, to form the active material 10 having the surface that is treated with a coating layer 50b. The precursor coating layer 50a may include the first precursor coating layer 40a and the second precursor coating layer 40b, and the coating layer 50b may include the first metal oxide and the second metal oxide.

The coating layer 50b may include, for example, a combination of a first metal oxide layer and a second metal oxide layer, a combination of a mixed layer of the first metal oxide and the second metal oxide and the second metal oxide layer, a combination of the first metal oxide layer, the mixed layer of the first metal oxide and the second metal oxide and the second metal oxide layer, or a combination of the first metal oxide layer and the mixed layer of the first metal oxide and the second metal oxide. Also, the coating layer 50b may further include a polyanion in addition to the second metal oxide.

For example, operation 240 may be performed by a process described above with reference to FIG. 3.

The surface treatment method may further include, after operation 240, a post treatment process (for example, a grinding process) applicable in the art to which the present disclosure relates, however, further description of the post treatment process is omitted herein.

EXAMPLE 1

(1) Surface Treatment of Active Material

A first precursor and a second precursor were added to a solvent and stirring was performed, to prepare a precursor solution. An anode active material was put into the precursor solution and stirring was performed for 2 hours, and dried power was dried in an oven at 110° C. for 6 hours.

Figure 6A:
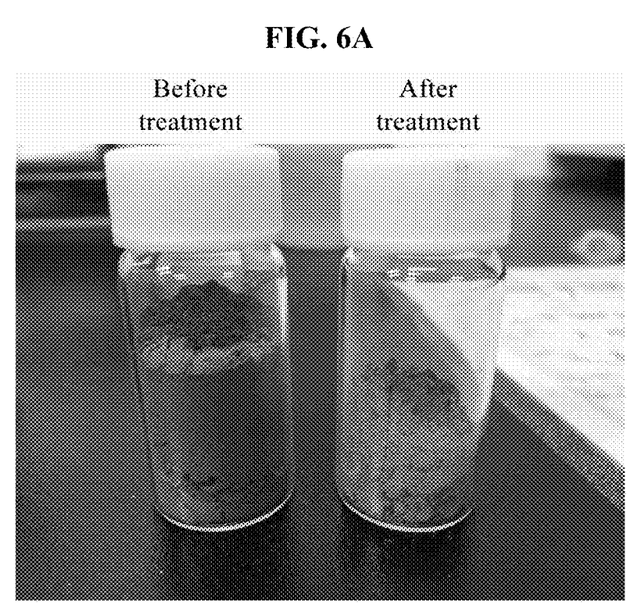
FIGS. 6A and 6B illustrate an energy dispersive X-ray analysis (EDXA) result and an image of a surface-treated active material prepared in Example 1 according to an example embodiment.
Figure 6B:
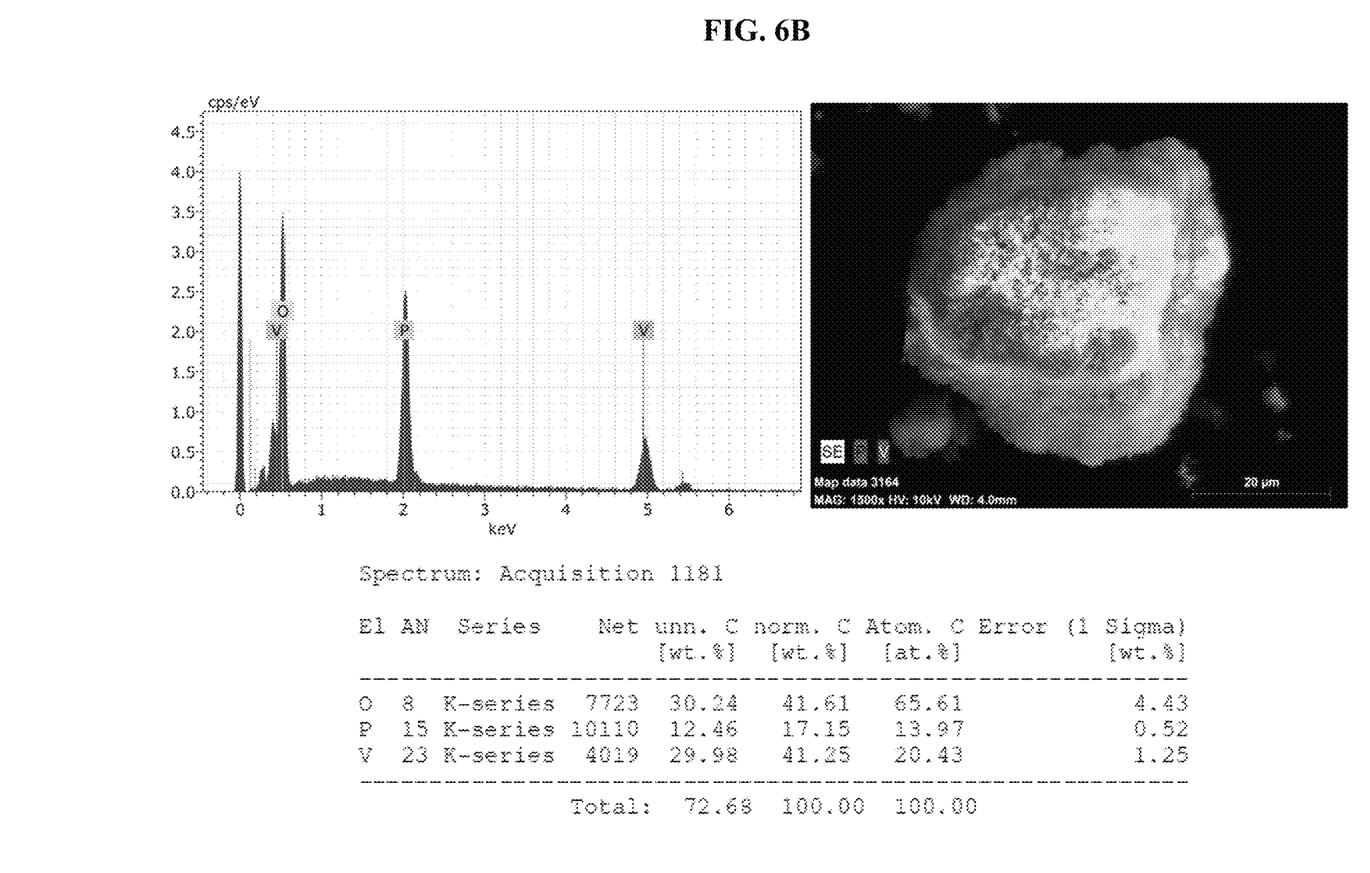
Figure 7:
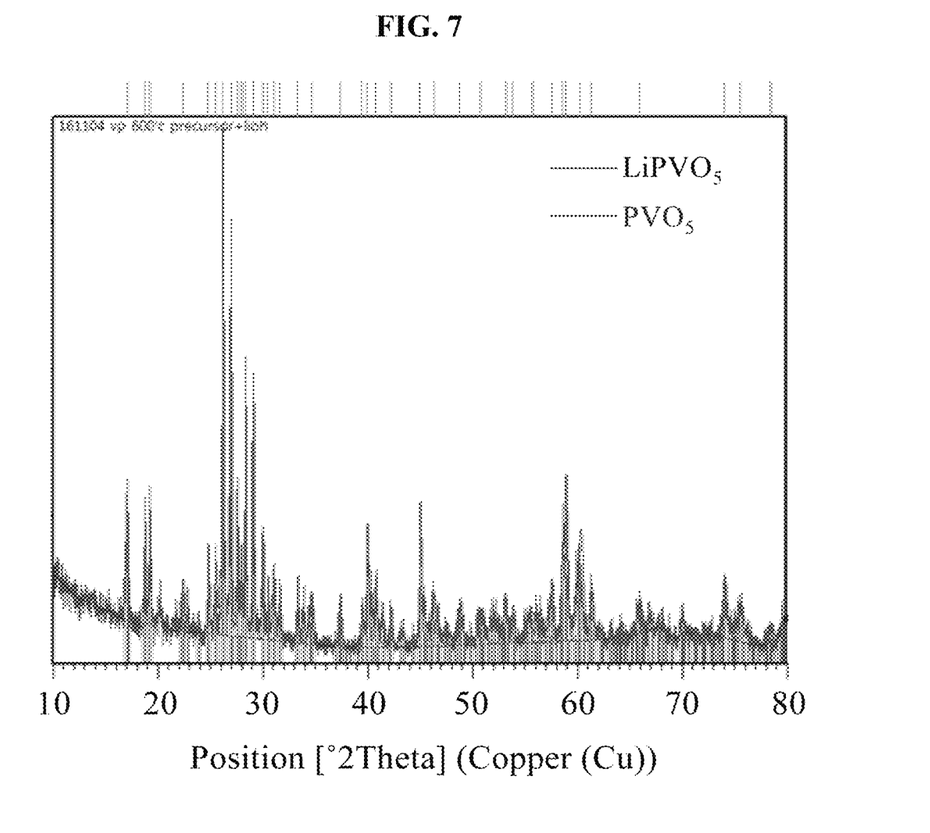
FIG. 7 illustrates an X-ray diffraction (XRD) pattern of the surface-treated active material prepared in Example 1.

The dried power was put into a furnace in an air atmosphere, and heat-treatment was performed at 800° C. for 3 hours, to acquire a surface-treated active material, for example, $LiNi_{0.2}Co_{0.2}Mn_{0.6}O_2$. An energy dispersive X-ray analysis (EDXA) and an X-ray diffraction (XRD) of the surface-treated active material were measured, and an image of the surface-treated active material and measurement results are shown in FIGS. 6A, 6B and 7. Based on the EDXA and XRD, it is found that the active material is coated with a metal oxide by verifying a crystal structure and components of each of $LiPVO_5$ and $PVO_5$.

(2) Fabrication of Electrode and Battery

The surface-treated active material prepared according to Example 1 was used to fabricate an electrode and a battery. A cathode active material (for example, graphite), a carbon black and a polymer binder (for example, polyvinylidene fluoride (PVDF)) were used in a mass ratio of 8:1:1, were dissolved in N-methylpyrrolidone (NMP), and coating with a Cu foil was performed, to fabricate a cathode.

The surface-treated active material prepared according to Example 1, a carbon black, and a polymer binder (for example, PVDF) were used in a mass ratio of 5:2:3, were dissolved in NMP, and coating with an aluminum collector was performed, to fabricate an opposite electrode. A 1.15 M $LiPF_6$ dissolved in a mixture of ethyl carbonate (EC), dimethyl carbonate (DMC) and ethyl methyl carbonate (EMC) mixed in a volume ratio of 3:4:3 was used as a non-aqueous electrolyte solution, and a polypropylene (PP) separator of 20 μm (celgard 2400) was used as a separator, to fabricate a lithium secondary battery.

COMPARATIVE EXAMPLE 1

A surface treatment of an active material was performed in the same manner as in Example 1 except that a polyanion precursor is not applied, to fabricate an electrode and a battery.

(1) Initial Efficiency Evaluation

Anodes of the batteries fabricated according to Example 1 and Comparative Example 1 were charged with a constant current of 0.1 C up to 4.6 V, and discharged up to 2 V with a constant current of 0.1 C until a charging current reaches 0.02 C at a constant voltage, to measure a discharge capacity. Also, an initial charge and discharge efficiency was calculated based on a charge capacity and a discharge capacity for a single cycle. Results are shown in Table 1 and FIG. 8.

TABLE 1

| Battery | Charge (mAh g$^{-1}$) | Discharge (mAh g$^{-1}$) | i.C.E (%) |
|---|---|---|---|
| Comparative Example 1 | 283 | 252 | 89.0 |
| Example 1 | 279 | 263 | 94.3 |

(2) Lifespan Evaluation

The batteries fabricated according to Example 1 and Comparative Example 1 were charged with a constant current of 0.5 C=100 mA/g at a room temperature. When a voltage of a battery reaches 4.6 V, the battery was charged once at a constant voltage of 4.6 V until a charging current reaches 4 mA/g (0.02 C). The battery charged once was discharged at a constant current of 1 C until the voltage reaches 2 V, and a discharge capacity after a single cycle was obtained. Charging and discharging were repeated up to 100 cycles, to measure a discharge capacity for each of the 100 cycles and to calculate a capacity retention ratio (%).

Also, a charge output and discharge output were calculated at the room temperature due to a voltage difference caused by charging and discharging at 0.5 C to 4 C for 10 seconds. Results are shown in Table 2 and FIGS. 9A and 9B.

TABLE 2

| Battery | Discharge (mAh g$^{-1}$) @ 1 C | 100$^{th}$ retention 25' C (%) | Rate (4 C/0.5 C) |
|---|---|---|---|
| Comparative Example 1 | 203 | 61 | 57% |
| Example 1 | 197 | 91 | 65% |

Figure 8:
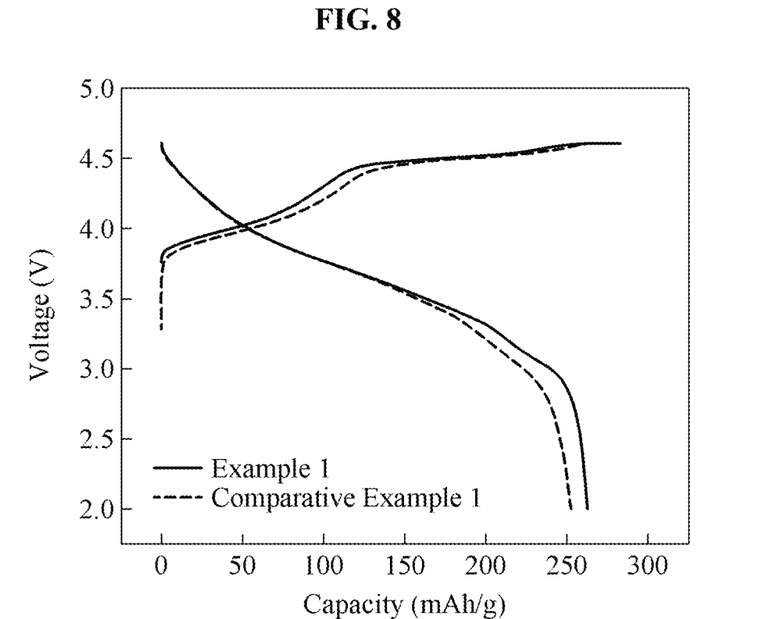
FIG. 8 illustrates initial capacities of batteries fabricated based on Example 1 and Comparative Example 1 according to an example embodiment.

Referring to Table 1 and FIG. 8, an initial lifespan characteristic of a battery to which an anode active material having a surface treated with a metal oxide according to an example embodiment is applied is significantly enhanced in comparison to a battery to which the anode active material of Comparative Example 1 to which a polyanion is not applied is applied.

Figure 9A:
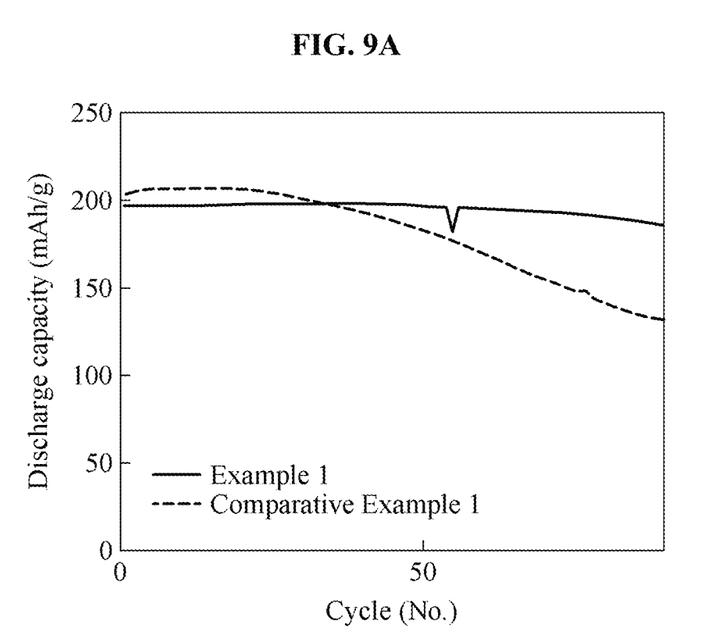
FIGS. 9A and 9B illustrate lifespan characteristics of the batteries fabricated based on Example 1 and Comparative Example 1.
Figure 9B:
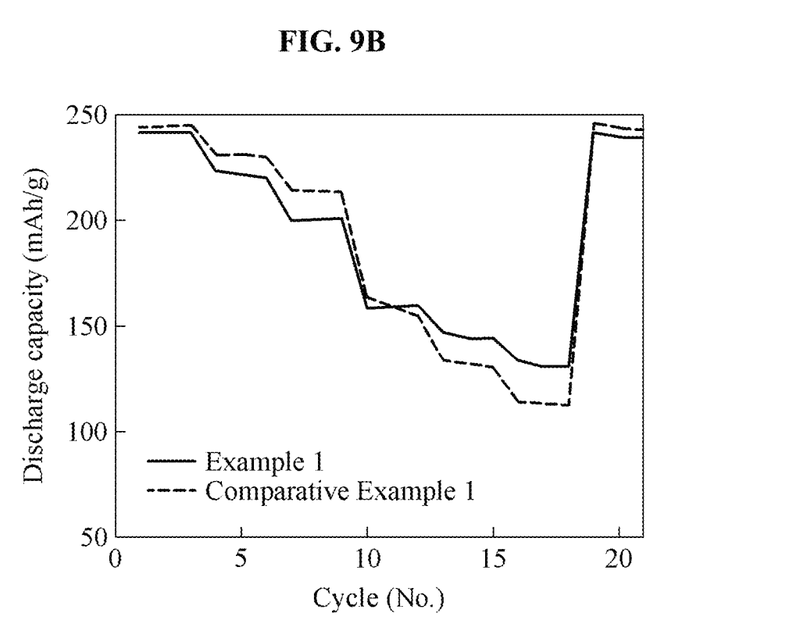

Also, referring to Table 2 and FIGS. 9A and 9B, the battery to which the anode active material having the surface treated with the metal oxide according to an example embodiment is applied, has a high capacity retention ratio after the 100 cycles, and a rate characteristic of the battery is hardly changed. However, in the battery to which the anode active material of Comparative Example 1 is applied, a capacity retention ratio rapidly decreases as a number of cycles increases.

According to example embodiments, a surface of an active material may be treated with a metal oxide, and a surface of the metal oxide may be treated with a lithium metal oxide formed by a reaction with residual lithium on the surface of the active material and with a metal oxide formed by a polyanion. Thus, a coating layer may be stably formed, and an initial efficiency and lifespan characteristics may be simultaneously enhanced by the lithium metal oxide and metal oxide.

According to example embodiments, a surface of an active material may be treated with a metal oxide layer, and thus it is possible to simultaneously enhance an initial efficiency, lifespan characteristics and rate characteristics.

According to example embodiments, it is possible to apply a surface-treated active material to various active materials, for example, a high-voltage active material, an active material for electric vehicle batteries, an active material for lithium secondary batteries, and the like, and possible to enhance a stability and output characteristic of a battery.

Although a few example embodiments of the present disclosure have been shown and described, the present disclosure is not limited to the described example embodiments. Instead, it would be appreciated by those skilled in the art that changes may be made to these example embodiments without departing from the principles and spirit of the present disclosure, the scope of which is defined by the claims and their equivalents.

What is claimed is:

1. A surface treatment method of an active material, the surface treatment method comprising:
    a) preparing a precursor solution comprising a first precursor used to generate a first metal oxide containing lithium, wherein the first metal oxide is represented by the following Chemical Formula 1:

$Li_xM_yO_z$     [Chemical Formula 1]

wherein M comprises at least two selected from the group consisting of P, V, S, and W, and x, y and z are 1 to 8; and
    a second precursor used to generate a second metal oxide, wherein the second metal oxide comprises at least one selected from the group consisting of P, S, W and V, and wherein the second precursor comprises at least one selected from the group consisting of an ammonium salt, an aniline salt, a pyridinium salt, a methylammonium salt and an ammonium carbonate salt that are used to generate an anion; and
    b) coating the active material with a precursor solution comprising the first precursor and the second precursor by mixing the active material with the precursor solution to generate a coating layer on said active material, wherein said coating layer comprises a mixture of said first metal oxide containing lithium and said second metal oxide; and
    heat-treating the active material comprising said coating layer at a temperature of 300° C. to 1000° C. for 30 minutes to 5 hours,
    wherein the anion comprises at least one of $(XO_4)^{n-}$ wherein X is P, S, W or V, and n is 1 to 4.

2. The surface treatment method of claim 1, wherein a mass ratio of the first precursor:the second precursor ranges from 1:1 to 1:100.

3. The surface treatment method of claim 1, wherein the first precursor comprises at least one selected from the group consisting of a nitride of a metal, a chloride of a metal, a sulfide of a metal, an acetate of a metal, and a carbonate of a metal.

* * * * *